(12) United States Patent
Blomquist

(10) Patent No.: US 6,336,992 B1
(45) Date of Patent: Jan. 8, 2002

(54) METHOD AND APPARATUS FOR WETTING FIBROUS MATERIAL

(75) Inventor: Markus Blomquist, Turku (FI)

(73) Assignee: Günter Betz, Brittnau (CH)

( * ) Notice: Subject to any disclaimer, the term of this patent is extended or adjusted under 35 U.S.C. 154(b) by 0 days.

(21) Appl. No.: 09/600,633

(22) PCT Filed: Jan. 28, 1999

(86) PCT No.: PCT/FI99/00055

§ 371 Date: Jul. 20, 2000

§ 102(e) Date: Jul. 20, 2000

(87) PCT Pub. No.: WO99/39043

PCT Pub. Date: Aug. 5, 1999

(30) Foreign Application Priority Data

Jan. 30, 1998 (FI) ................................................... 980214

(51) Int. Cl.⁷ ............................ D21H 11/14; D21B 1/32
(52) U.S. Cl. ............................. 162/4; 162/8; 162/21; 162/22
(58) Field of Search ........................ 162/4, 8, 21, 22; 241/17, 18; 422/232, 292

(56) References Cited

U.S. PATENT DOCUMENTS

| 5,271,805 A | * | 12/1993 | Stockel et al. | 162/4 |
| 5,496,439 A | | 3/1996 | Carlson et al. | 162/4 |
| 5,536,373 A | | 7/1996 | Carlson et al. | 162/261 |
| 5,540,391 A | * | 7/1996 | Anderson | 241/17 |

FOREIGN PATENT DOCUMENTS

FI 944341 11/1994

* cited by examiner

Primary Examiner—Dean T. Nguyen
(74) Attorney, Agent, or Firm—Nixon & Vanderhye P.C.

(57) ABSTRACT

A method and an apparatus for wetting fibrous material, such as coarsely shredded waste paper. Fibrous material and wetting fluid is introduced into a wetting enclosure. Pressure is decreased within the wetting enclosure for a short period of time for sucking out air from the fibrous material. Pressure is allowed to increase rapidly, whereby wetting fluid is sucked into cavities within the fibrous material and the material is efficiently wetted.

8 Claims, 2 Drawing Sheets

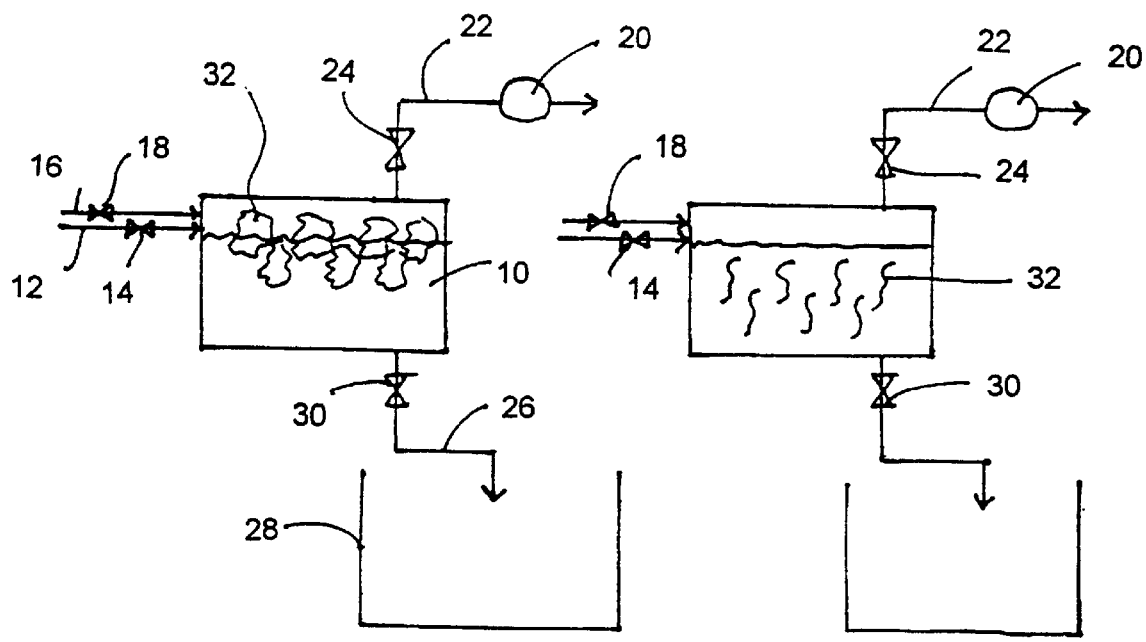
Fig. 1
Fig. 2
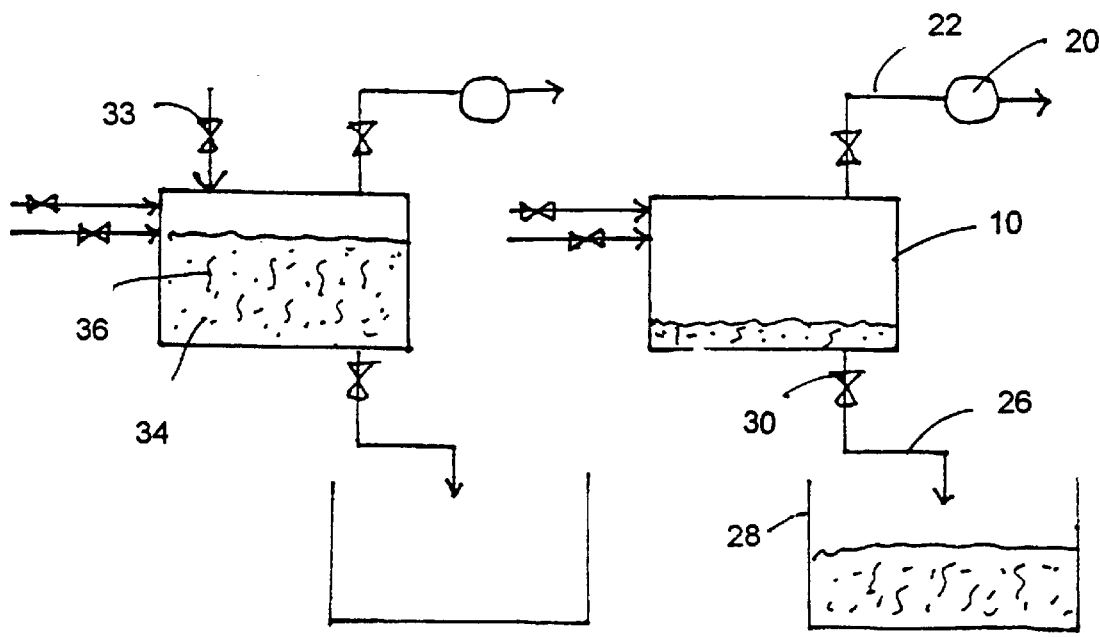
Fig. 3
Fig. 4

METHOD AND APPARATUS FOR WETTING FIBROUS MATERIAL

FIELD OF INVENTION

The present invention relates generally to a method and an apparatus for wetting fibrous material as stated in the preamble of appended independent claims 1 and 9.)

BACKGROUND AND SUMMARY OF INVENTION

Waste paper, from which cellulosic fiber material is to be reused, is processed to separate and recover clean fibers therefrom. Waste paper includes besides cellulosic fibers different types of contaminants, such as plastic, aluminum foils or wax used in layered paper or board, inks used in printing paper and also common dirt. The fibrous material in waste paper includes air between fibers, as well as, within the fibers themselves. Containers made of milk carton board and liquid carton board, i.e. layered material combining cellulosic fiber material with e.g. plastic material and/or Al-foil material, form a huge amount of waste material which needs to be recycled.

Typically waste paper mixed with a wetting agent is treated mechanically in a pulper or a slusher in order to disintegrate the paper and soak the fine paper material, fibrous material, until the fibers are sufficiently swollen to be separated.

The paper material may be soaked as long as it takes for all fibers therein to be completely wetted so that they may be washed or separated from any other material present in the paper, e.g. plastic, Al-foils, wax, ink etc. A long treatment, however, also tends to break or cut any non-fibrous material present in the waste paper into very fine particles, which fine non-fibrous particles are hard to separate from the cellulosic fibers. The particles are discharged with the accept fibers and transported to the next processing stage of the fibers which are to be recycled. Particularly plastic particles or Al-particles tend to cause severe problems in any such subsequent processing stage.

The beating treatment in a pulper also tends to affect the fibrous material itself. Long good quality fibers tend to break during the treatment, which leads to a decreased recycled fiber quality.

In order to prevent good quality fibers from being affected by the treatment and fine non-fibrous material (Al-foil or plastic) from entering subsequent processing stages the waste paper may be processed very gently and only for a short time period in the pulper. Such gentle treatment during a short time period only, however, leads to a very limited capacity of the recycling process. Up to 35% of the fiber material may remain unseparated and be discharged with the non-fibrous material without being recycled. This leads to increased cost of waste treatment. It is not only the fiber material mixed with e.g. Al-material which becomes impossible to use, it seems that also the Al-material becomes impossible to recover.

It is therefore an object of the present invention to provide an improved method and apparatus for wetting fibrous material in order to recover a maximal amount of good quality fibers.

It is particularly an object of the present invention to provide a method and an apparatus according to which fibrous material may be very rapidly separated from non-fibrous material, with a minimum deteoriation of the fiber material and with a maximal separation of contaminants.

It is also an object of the present invention to provide a method and an apparatus which provides an efficient wetting of fibrous material, such as cellulosic pulp in order to provide an efficient way of treating the fibrous material with desired additives, such as coloring agents, bleaching agents, surface tension decreasing agents or fire proofing agents or agents rendering the fibrous material hydrophilic or hydrophobic properties.

The above objects are achieved by a method and apparatus comprising features as stated in the characterizing portions of the appended independent claims 1 and 9.

A typical method for wetting fibrous material, such as coarsely shredded waste paper, comprises the steps of:
  (a) introducing the fibrous material into a wetting enclosure;
  (b) introducing wetting fluid into the wetting enclosure and allowing the fibrous material to be wetted by the wetting fluid;
  (c) discharging a suspension of wetted fibrous material and wetting fluid from the wetting enclosure;
  (d) decreasing the pressure within the wetting enclosure during step (a) or step (b) to a pressure $p_1$ and
  (e) after step (d) increasing the pressure within the wetting enclosure to a pressure $p_2$ while keeping the fibrous material immersed in the wetting fluid.

In step (d) the pressure within the wetting enclosure is decreased e.g. by a vacuum pump or other ways of imposing a suction thereon. The pressure is preferably decreased to a pressure corresponding to 1–10 m water column. The wetting enclosure is thereby a vessel of the vacuum vessel type able to withstand vacuum as desired. The vacuum or low pressure brought about in the wetting enclosure forces air present in the waste paper, air within the fiber material and also air within the fibers itself, to be sucked out. Hollow empty spaces formed within the fiber material and within the fibers collapse. The fiber material, which at the beginning of the wetting process may have been floating on the surface of the wetting fluid is thereby immersed into the fluid.

Vacuum or low pressure may be established very rapidly, within a few seconds almost instantly, with a vacuum pump or other similar equipment known per se. The vacuum or low pressure is induced only for the very short period which it takes for air to be discharge from the fiber material as desired. As soon as the fibrous material is suitably immersed in the wetting fluid pressure is very rapidly increased in the wetting enclosure e.g. by allowing water or air to flow into the enclosure, the fibrous material being still immersed in the wetting fluid.

The increased pressure on the wetting fluid forces fluid to flow into collapsed empty spaces within the fibers and other cavities from which air was sucked out during the vacuum or low pressure treatment stage. Fibers swell rapidly as fluid penetrates into the fibers between different layers therein. The rapid swelling of fibers loosens the fibers from any non-swelling material, such as plastic or Al-foil material, to which the fibers may be bound to.

Steps (d) and (e) are preferably repeated at least once, more preferably several times. This can easily be done as the time span of steps (d) and (e) is very short. The decreasing and increasing of the pressure within the wetting enclosure may take place within an interval of <1 minute, preferably <30 seconds, most preferably <10 seconds.

The present invention may be applied on a batch process or a continuous process. In a typical batch process a batch of the fibrous material is introduced into a wetting enclosure whereafter the pressure in the wetting enclosure is decreased and wetting fluid is introduced into the enclosure. Immediately thereafter the pressure in the enclosure is allowed to rise, e.g. to the atmospheric pressure level, whereby wetting fluid is sucked into hollow spaces and cavities in the fibrous material from which air was sucked out during the vacuum treatment stage. The fluid penetrating into the fibers causes the fibers to swell and thereby come loose from any material not subjected to similar swelling.

If desired the wetting agent may be introduced into the wetting enclosure before the vacuum treatment stage. Then a batch of the fibrous material and wetting fluid is introduced into a wetting enclosure whereafter the pressure in the wetting enclosure is decreased to a desired level to suck out air from the fibrous material. Thereafter the pressure in the enclosure is allowed to rise again to force wetting fluid to be sucked into hollow spaces in the fibrous material.

It is also possible to arrange for a continuous process, in which a flow of fibrous material and a flow of wetting fluid is continuously fed into a first wetting enclosure having a subatmospheric pressure $p_1$ therein, in which enclosure the fibrous material is treated by vacuum so that air is sucked out of the fibrous material, a flow of mixed vacuum treated fibrous material and wetting fluid is continuously fed from the first wetting enclosure into a second enclosure having a pressure $p_2$ therein, the pressure $p_2$ being $>p_1$, in which second enclosure wetting fluid is sucked into the fibrous material and into hollow spaces within the fibers, the fibers thereby being wetted and swollen, a flow of mixed wetted fibrous material and wetting fluid including separated fibers is discharged from the second enclosure into a separator in which accepted fiber material is separated from contaminants, e.g. non-fibrous material, and a flow of a suspension of accepted fiber material and wetting fluid is discharged from the separator separately from a flow of contaminants.

If desired a flow of mixed partly wetted fibrous material and wetting fluid may be introduced from the second enclosure into a third enclosure for a second vacuum treatment stage and further from the third enclosure into a fourth enclosure having a higher pressure therein than the pressure in the third enclosure. A flow of mixed fully wetted fibrous material and wetting fluid is then discharged into a separator. If needed the fibrous material may be transported through more than two consecutive vacuum treatment stages, e.g. 3 to 5 different vacuum stages and corresponding higher pressure stages therebetween, until the fibrous material is sufficiently wetted.

A continuous wetting process may be performed as described by transporting a flow of fibrous material through e.g 3 to 10 separate consecutive treatment vessels. Wetting fluid or other fluid may be added into the flow during any of the separate stages or material may be discharged from any of the separate stages.

A continuous wetting process may on the other hand be performed in a single vessel divided into separate pressure tight compartments through which a flow of fibrous material and wetting agent is forced to flow. A vessel of a screw conveyor type could be used.

BRIEF DESCRIPTION OF THE ACCOMPANYING DRAWINGS

The present invention is described in more detail in the following with reference to the accompanying drawings in which FIG. 1 shows schematically a wetting treatment apparatus according to the present invention during filling thereof;

FIG. 2 shows the wetting apparatus in FIG. 1 during a vacuum treatment stage;

FIG. 3 shows the wetting apparatus in FIG. 1 after the vacuum treatment stage when pressure has been rapidly increased in the enclosure;

FIG. 4 shows the wetting apparatus in FIG. 1 during the discharging stage and

DETAILED DESCRIPTION OF THE PREFERRED EMBODIMENTS

Figure 5:
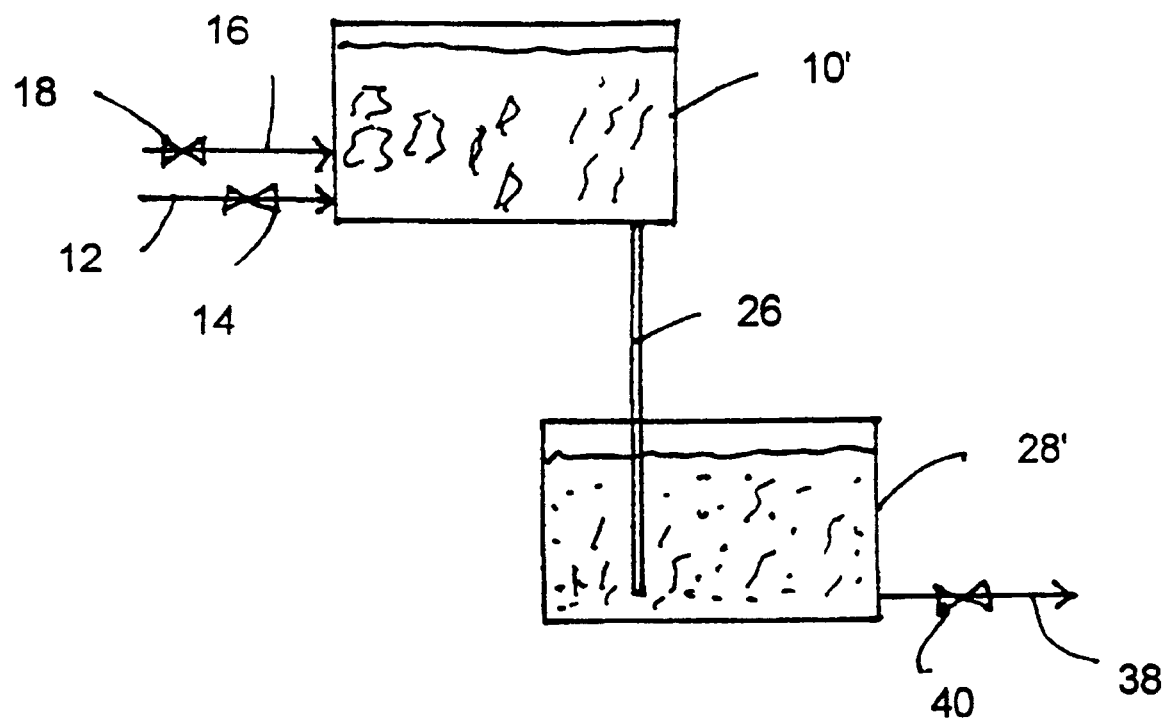
FIG. 5 shows schematically another wetting apparatus in which fibrous material may be continuously wetted.

FIG. 1 shows a wetting enclosure 10, for wetting a fibrous material, such as waste paper, particularly liquid carton board, during the filling of the enclosure. Coarsely shredded waste paper, in bits having a length and width of e.g. 1–20 cm, preferably about 10 cm, is introduced into the wetting enclosure 10 through a conduit 12, a valve 14 therein being open. Wetting fluid, typically water, is introduced through a conduit 16, a valve 18 therein being open. An additive, such as surface tension decreasing agent, wetting agent or any other suitable agent desired may be added to the water. The wetting enclosure is filed until the waste paper and wetting fluid almost fill the wetting enclosure. The fibrous material partly floats on the surface of the wetting fluid.

A vacuum pump 20 is connected to the enclosure through a conduit 22. The conduit 22 is closed by valve 24 during the filling stage. A discharge conduit 26 is connected to the bottom of the wetting enclosure in order to discharge wetted fibrous material and wetting fluid therethrough into a vessel 28 arranged below the wetting enclosure. A valve 30 in the conduit is closed to prevent material from being discharged from the wetting enclosure during the filling stage.

Valves 14 and 18 are closed when the enclosure 10 is filled to a suitable level with a mixture of fibrous material and wetting fluid valves. The fibrous material, bits of waste paper 32 or similar, is at least partly floating on the surface of the wetting fluid.

FIG. 2 shows the apparatus during the vacuum treatment stage. Valves 14, 18 and 30 are closed and a vacuum corresponding to about 1–10 m water column is provided by the vacuum pump 20 as the valve 24 in conduit 22 is opened. Air is sucked out of the wetting enclosure 10. Air is thereby also sucked out from the air containing fibrous material 32 and the individual fibers in the enclosure. Cellulosic fibers contain small amounts of air within the fiber, between different layers of the fiber, which may be sucked out. Hollow spaces thereby collapse and fibers and paper bits shrink. It is schematically shown in FIG. 2 pieces of paper 32 that have shrunk compared to the pieces of paper shown in FIG. 1. The vacuum pressure or low pressure level needed is achieved in a very short time period, which may be only some seconds, depending on e.g. the efficiency of the vacuum pump and the air volume to be sucked out of the wetting enclosure.

As soon as enough air has been sucked out of the fiber material and the material has collapsed and become totally immersed in the wetting fluid valve 24 is closed and the pressure is allowed to rise again in the enclosure. The pressure may be raised by allowing additional wetting fluid to flow into the enclosure or by opening a venting valve 33 shown in FIG. 3.

Pressure increase forces wetting fluid to flow into the hollow spaces, formed in the fibrous material and in the individual fibers, during the vacuum treatment as air was sucked out. The hollow spaces deformed and collapsed during the vacuum treatment, now strive to take their original form by filling the collapsed emptied spaces. As the fibrous material is totally immersed in the wetting fluid an increase in pressure will force wetting fluid to fill the empty spaces.

The pressure is increased very rapidly in the enclosure in order to achieve a sudden "explosive" reformation of the cavities within the fiber. The cavities are then filled with water, i.e. the fibers are wetted and swollen. Wetted fibers become flexible and easy to loosen from surrounding material without breaking the fiber or breaking the non-fibrous material to which the fibers were originally attached. It can be seen in FIG. 3 that individual fibers or fiber bundles 34 have been loosened from the fibrous material, whereas non-fibrous material, such as e.g. plastic, Al-foil or similar material, remains almost in its original size, i.e. in large bits of pieces 36.

Wetting fluid penetrates very rapidly into the fibrous material, e.g. within a few seconds, whereafter the mixture of fibrous material and wetting fluid may be discharged as shown in FIG. 4 by opening valve 30 in conduit 26 leading to discharge vessel 28. From the discharge vessel the mixture may be transferred to a separator (not shown) in which non-fibrous large size material may easily be separated from the suspension of fine separate fibers and wetting fluid.

In order to improve the wetting and swelling of the fibers, processes in FIGS. 2 and 3 may be repeated, i.e. vacuum is induced a second time in the enclosure for sucking out additional air, whereafter pressure is allowed to raise again in the enclosure. Subsequent vacuum and pressure rising steps may if desired be performed in a separate second, third and fourth enclosures.

The vacuum and pressure steps may be repeated as many times as necessary. It may be necessary to perform the wetting in several subsequent steps particularly if air is prevented from being completely or to a desired degree sucked out from fibrous material. This is e.g. the case when wetting liquid carton board in which fibrous material is covered on both sides by tight e.g. plastic or Al-foil material. Fibers are dislodged layer by layer from the borders of the pieces of the layered paper material as air is only sucked out from the outermost layers during each vacuum step. It may help to rupture or pick holes in the tight covering layers before introducing the material into the wetting enclosure, in order to achieve more starting points for the wetting process.

The wetting process shown in FIGS. 1–4 is a batch process. The present new method may, however, be used continuously, as well, as shown in FIG. 5. Fibrous material is continuously introduced through a conduit 12 and wetting fluid through conduit 16 into an upper closed vessel 10', the wetting enclosure. A discharge conduit 26 connected to the bottom of the upper vessel connects the upper vessel with a closed lower vessel 28', the discharge vessel. The lower vessel 28' is almost filled with a suspension of fibrous material and wetting fluid discharged from the upper vessel 10'. The discharge conduit 26 is arranged to penetrate deep into the lower vessel 28' below the upper surface of the suspension therein, in order to provide a seal between the upper vessel 10' and the lower vessel 28'.

Wetting fluid and fibrous material immersed in the fluid is forced by the difference in level between the upper and lower vessels to flow from the upper vessel into the lower vessel, thereby inducing a vacuum in the upper level. The pressure in the lower level is maintained at a higher level, e.g. at ambient pressure. The two vessels are located at such levels that a necessary difference in pressure between the two vessels is achieved, to provide for the vacuum treatment needed for sucking out air from the fibrous material in the upper vessel and the rise in pressure to provide for the wetting of the fibers in the lower vessel.

An outlet conduit 38 is provided in the lower vessel 28' for discharging wetted material therefrom. Valves 14, 18 in inlet conduits 12 and 16 and valve 40 in the outlet conduit 38 may be controlled to control the continuous flow of material through the two vessels and the pressure levels in the two vessels. The fibrous material is arranged to flow at a suitable velocity through the two vessels to achieve desired wetting of the material.

The present invention provides following advantages:

the vacuum-wetting process allows fibers to be separated more rapidly from layered material, such a milk carton board or liquid carton board, whereby smaller and cheaper process vessels may be used for the slushing, washing and separation than before; some process steps may even become unnecessary;

smaller volumes of contaminated material have to be separated from the process as fiber material is more completely recovered and not included in the contaminants anymore;

the size of non-fibrous material is not reduced in this process as much as during earlier processes, the non-fibrous material remains in a size which allows for easy separation thereof;

substantially shorter time is needed for subsequent process treatment steps, such as bleaching, as the fibrous material is more completely wetted; shorter bleaching time means less damage on the fiber material;

production may be substantially increased if same size production apparatus is used as earlier;

or the same production as earlier may be achieved by substantially smaller production apparatus;

the wetting fluid, into which additives or treatment agents may be solved or mixed, is immediately brought deep into air containing fibrous material, which allows the additive or agent to immediately work from within the material;

wetting fluid penetrated evenly into air containing fibrous material, provides an even treatment of the material;

the fibrous material is completely wetted in shorter time than in earlier known wetting processes, the fibrous material thereby also swelling more rapidly than before to a maximal size;

often mechanical pretreatment steps, such as cutting, chopping and disintegration, for providing a larger wetting surface, are not necessary when wetting air containing fibrous material with the present vacuum process.

Short wetting impulses, i.e. short vacuum and pressure pulses have appeared to be very advantageous for wetting air containing fibrous material. Very short pulses of- only some seconds <1 minute, preferably <30 seconds, more preferably <10 seconds, may be used. The length of period and the need of repeated treatment periods depends on the fibrous material which is to be wetted. Heating of the wetting fluid also tends to improve the present wetting process.

The present vacuum wetting process is particularly useful when wetting layered fibrous material, such as liquid carton board, in which the fibrous material is layered on both sides by an impervious layer. Wetting starts at all sides of the coarsely shredded material pieces in the wetting vessel. By repeating several times the short vacuum and pressure steps layer after layer of fibrous material may be dislodged from the sides of the layered material, without having to cut the layered material into small pieces and without having to maintain already dislodged fibers in the treatment vessel until all fibers are dislodged, loosened. The treatment of tight, water impervious, layered material may of course be speeded up by gently making the upper layers porous, such as to allow penetration of liquid in between the layers also. Also chemicals, such as surface tension decreasing agents or other common wetting agents may be used to improve wetting in the present wetting process.

The present invention may be used for wetting of tape material, glued layered paper, tape with silicon coating, without having to first solve the glue material. The present invention provides a wetting process in which contaminants are very gently treated and therefore are easily separated from the fibers, often in only one or a few separation steps compared to earlier processes.

The vacuum wetting process may besides common wetting and swelling, defibration, be used for treatment of fibers with hydrophobic or hydrophile agents;

deep-coloring of fibers;

flame-guarding of fibers;

bleaching of fibers;

increasing wet-strength of fiber material;

impregnation of fibers.

The present invention is not to be limited to the exemplary applications mentioned in the present description, but should on the contrary cover all applications possible within the scope and spirit of the appended claims.

What is claimed is:

1. A method for wetting coarsely shredded waste paper material, comprising the steps of:
   (a) introducing the waste paper material into a wetting enclosure;
   (b) introducing wetting fluid into the wetting enclosure and allowing the waste paper material to be wetted by the wetting fluid; and
   (c) discharging a suspension of wetted waste paper material and wetting fluid from the wetting enclosure;
   (d) decreasing the pressure within the wetting enclosure during step (a) or step (b) to a pressure $p_1$; and
   (e) after step (d) increasing the pressure within the wetting enclosure to a pressure $p_2$ while keeping the waste paper material immersed in the wetting fluid, wherein
   (f) steps (d) and (e) are practiced such that the decreasing and increasing of the pressure within the wetting enclosure take place within an interval of <1 minute, and wherein steps (d) and (e) are repeated at least two times.

2. A method according to claim 1, wherein the decreasing and increasing of the pressure within the wetting enclosure take place within an interval of <30 seconds.

3. A method according to claim 1, wherein the decreasing and increasing of the pressure within the wetting enclosure take place within an interval of <10 seconds.

4. A method according to claim 1, 2 or 3, wherein decreasing the pressure in the wetting enclosure during step (d) corresponds to 1–10 m water column.

5. A method according to claim 1, which is practiced by the following consecutive steps: introducing a batch of the waste paper material into the wetting enclosure, introducing wetting fluid into the enclosure, decreasing the pressure ~n the enclosure and increasing the pressure in the enclosure.

6. A method according to claim 1, which includes the steps of:

introducing the waste paper material and wetting fluid continuously into a first wetting enclosure having a subatmospheric pressure $p_1$ therein, transporting the mixture of waste paper material and wetting fluid from the first wetting enclosure into a second wetting enclosure with a pressure $p_2$ which is higher than the pressure $p_1$, transporting the mixture of waste paper material and wetting fluid from the second wetting enclosure into a third wetting enclosure having a subatmospheric pressure $p_3$ therein, transporting the mixture of waste paper material and wetting fluid from the third wetting enclosure into a fourth wetting enclosure having a pressure $p_4>p_3$ therein.

7. An apparatus for wetting coarsely shredded waste paper, the apparatus comprising:

(i) a vacuum vessel serving as a wetting enclosure capable of withstanding a vacuum of at least up to 1–10 m water column therein, (ii) a waste paper supply for introducing the waste paper material into the wetting enclosure, (iii) a wetting fluid supply for introducing wetting fluid into the wetting enclosure, (iv) a discharge for discharging a suspension of wetted waste paper material and wetting fluid from the wetting enclosure, and (v) a pressure control system for alternately and repeatedly decreasing the pressure within the wetting enclosure to a pressure $p_1$<ambient pressure and increasing the pressure within the wetting enclosure to a pressure $p_2>p_1$ within an interval of <1 minute.

8. The apparatus of claim 7, wherein the pressure control system is capable of repeatedly decreasing and increasing the pressure at least two times.

* * * * *